United States Patent [19]

Harada et al.

[11] 4,100,446

[45] Jul. 11, 1978

[54] LIGHT SOURCE LAMP WITH PARTICULAR ENVELOPE STRUCTURE TO ACCOMMODATE EXTERNAL MAGNETS

[75] Inventors: Katsuhito Harada; Hideaki Koizumi; Konosuke Oishi, all of Katsuta, Japan

[73] Assignee: Hitachi, Ltd., Japan

[21] Appl. No.: 474,812

[22] Filed: May 30, 1974

[30] Foreign Application Priority Data

Jun. 1, 1973 [JP] Japan .................................. 48-60923

[51] Int. Cl.² ........................ G01J 3/30; H01J 61/067; H01J 61/33; H01J 1/50
[52] U.S. Cl. .................................. 313/161; 313/209; 313/217; 313/220; 356/86
[58] Field of Search ............... 313/161, 209, 210, 220, 313/217, 160, 153, 154; 356/85, 86

[56] References Cited

U.S. PATENT DOCUMENTS

| 2,855,820 | 10/1958 | Robinson | 356/85 |
| 3,390,297 | 6/1968 | Vollmer | 313/209 |
| 3,893,768 | 7/1975 | Stephens | 313/161 X |

OTHER PUBLICATIONS

"Effects of Magnetic Fields on Hollow-Cathode Discharge", from Industrial Laboratory, vol. 38, No. 11, Nov. 1972, pp. 1697–1699, published May 1973.

Primary Examiner—Palmer C. Demeo
Attorney, Agent, or Firm—Craig & Antonelli

[57] ABSTRACT

In a tubular bulb filled with inert gas, a cathode and an anode are disposed opposite to each other. Electric discharge is caused between the electrodes to emit optical radiation. The bulb has a smaller diameter at the portion thereof which surrounds the electrodes than at the other portion of the bulb, and a magnet to establish magnetic field to cause Zeeman effect in the direction of the electric field between the electrodes is disposed near the portion of the bulb having the smaller diameter.

14 Claims, 5 Drawing Figures

LIGHT SOURCE LAMP WITH PARTICULAR ENVELOPE STRUCTURE TO ACCOMMODATE EXTERNAL MAGNETS

BACKGROUND OF THE INVENTION

1. Field of the Invention

The present invention relates to a lamp used as light source for the device to measure atomic absorption of light, and more particularly to a light source lamp used in an atomic light absorption measurement device utilizing Zeeman effect.

2. Description of the Prior Art

The atomic light absorption measurement device is used mainly for the analysis of metallic elements. A metal compound can be decomposed into the vapor of atoms of constituent metallic elements at their ground state, by placing the compound in flame or a furnace. If the light emitted from the atoms of the same metal as one of the metallic elements are passed through the vapor of atoms at their ground state, the atoms of the one metallic element absorb a part of the light, with the remaining part of the light transmitted. The quantity of light absorbed by the atoms of the elements to be analyzed can be known from the variation of the intensity of the transmitted light with respect to the intensity of light emanating directly from the source. Since there is a proportional relation between the amount of light absorbed and the concentration of the atoms of the element to be analyzed, the quantity of the element to be analyzed can be determined from the amount of the light absorbed. The atomic light absorption measurement device is on the basis of the principle described above.

In an atomic light absorption analyzer, the apparent absorption of light in a sample due to dispersion and the molecular absorption of light contribute to an error from the true amount of light absorbed by the element to be analyzed. The error is appreciable enough so that it cannot be usually neglected. In general, the width of the absorption spectrum of an element to be analyzed is very narrow while the apparent absorption due to light dispersion or the molecular absorption takes place over a considerably wide range of wavelengths. So, in order to eliminate the aforementioned error, the light having a wavelength coincident with that absorbed by the element to be analyzed is used as sample light and the light having a wavelength different from that absorbed by the element to be analyzed is used as reference light, so that so-called two wavelength comparison measurement due to the comparison of the sample light to the reference light is performed. This comparison can be done in practice by making the ratio of or the difference between the intensities of the reference light and the sample light having passed through the sample.

It is preferable that the wavelength of the sample light is as near to that of the reference light as possible so far as the former is not coincident with the latter. Namely, it is preferable that since the width of the absorption spectrum of the element to be analyzed is, in terms of wave number usually less than 1 cm$^{-1}$, a wave number difference as small as 1 cm$^{-1}$ should exist between the sample light and the reference light. This is due to the fact as follows. Although such backgrounds as the apparent and the molecular absorptions occur over a comparatively wide range of wavelengths, they are not necessarily equal in amount for different wavelengths. Therefore, the effect of eliminating or compensating the backgrounds is greater when the wavelengths of the sample and the reference lights are as near to each other as possible than otherwise.

If a light source, which emits a single spectral line in the absence of magnetic field, is placed in magnetic field, a plurality of spectral lines are absorbed. Namely, one is the spectral line identical with the original spectral line observed in the absence of magnetic field and the other are the two components appearing a little separate in wavelength from and in symmetry with the original spectral line. The spectral line coincident with the original one is termed a $\pi$-component (corresponding to a magnetic quantum number variation $\Delta m = 0$) and the two symmetric spectral lines are referred to as $\sigma\pm$ and $\sigma^-$-components (corresponding respectively to $\Delta m = \pm 1$). It is known that the intensity of the $\pi$-component is theoretically equal to the sum of the intensities of the $\sigma\pm$ and $\sigma^-$-components. This phenomenon is known as Zeeman effect and only the $\sigma\pm$ and $\sigma^-$-components, which are respectively right-handed and left-handed, circularly polarized lights, are observed in the direction parallel to the magnetic field while in the direction perpendicular to the field the $\sigma\pm$ and $\sigma^-$-components, which are linearly polarized lights having a plane of oscillation perpendicular to the field, and the $\pi$-component, which is linearly polarized light having a plane of oscillation parallel to the field, are all observed. The wavelength of the $\pi$-component remains unaltered, independent of the degree of Zeeman effect but the deviation in wavelength of the $\sigma\pm$ and $\sigma^-$-components from the $\pi$-component depends upon the intensity of the magnetic field. Namely, it is known that there is a relation $\Delta\nu \propto H$, where $\Delta\nu(\text{cm}^{-1})$ is the deviation in terms of the change in wavenumber and H is the intensity of the magnetic field. Accordingly, if the $\pi$-component is used as sample light and the $\sigma\pm$ and $\sigma^-$-components are both used as reference light or if the $\sigma^-$-component is used as sample light and the $\sigma^+$-component as reference one, then the aforementioned two waveform comparison measurement is possible. It is, of course, easy to make the difference in wave number between the sample light and the reference light less than 1 cm$^{-1}$. Thus, the above description shows how useful the two wavelength comparison measurement utilizing Zeeman effect is.

In a device for measuring the atomic absorption of light, a lamp is used as light source, which comprises a bulb filled with such inert gas as argon and a cathode and an anode arranged in the bulb. In such a lamp, the cathode is sputtered by the positive ions produced as a result of the ionization of the inert gas due to the discharge between the electrodes and the atoms of the small particles produced near the cathode due to the sputtering of the cathode are excited by the positive ions produced due to the ionization of the inert gas, the electrons produced due to the ionization of the inert gas and accelerated toward the anode, and the secondary electrons produced as a result of the collision of the positive ions against the cathode and accelerated toward the anode.

Such a lamp has a diameter of at least about 16 mm. A magnet to establish a magnetic field of about 20 K gauss is needed for Zeeman effect to take place appropriately. However, in case where the lamp diameter is about 16 mm, a very large magnet is used to obtain a magnetic field of about 20 K gauss. In order to solve this problem, the size of the lamp may be reduced, but in such a case the decrease in the gas contained in the bulb must be accompanied so that the life of the lamp is shortened.

On the other hand, the inventors have proved through repeated experiments that the intensity of light emitted from the lamp and the luminous stability of the light depend largely upon the direction of the magnetic field and the direction of the electric field established between the cathode and the anode. Namely, in case where the direction of the magnetic field is not parallel to the direction of the electric field, the stability is very poor and the intensity is extremely low or sometimes reduced to zero for an intensity of the magnetic field higher than a certain level, so that the discharge condition attainable when there is no magnetic field cannot any longer be maintained. This is, according to the inventors' investigation, considered to be because the electrons are affected by so-called Lorentz force so that the number of collision of the particles against the cathode per unit time is reduced.

SUMMARY OF THE INVENTION

One object of the present invention is to provide a lamp used as light source for an atomic light absorption measurement device, which lamp utilizes Zeeman effect.

Another object of the present invention is to provide a lamp in which Zeeman effect can be appropriately caused by a small magnet.

An additional object of the present invention is to provide a lamp in which a small magnet is used and in which the established magnetic field is intense enough to appropriately cause Zeeman effect.

A yet another object of the present invention is to provide a lamp which uses a small magnet and has a long life.

A further object of the present invention is to provide a lamp which has a high luminous intensity and stability.

A yet further object of the present invention is to provide a lamp in which there is substantially no Lorentz force.

According to one feature of the present invention, there is provided a lamp comprising a bulb filled with discharging gas, a cathode and an anode disposed in the bulb opposite to each other, an electric power source to cause electric discharge between the cathode and the anode so as to produce spectrum of light, and magnets to induce a magnetic field to split the spectrum of light, wherein the bulb has at least one transparent portion through which the spectrum of light is taken out, the magnets are disposed outside the bulb and near that portion of the bulb which surrounds the cathode and the anode, and the dimension of the portion of the bulb near the magnets in the direction of the magnetic field of the magnets is smaller than at least one of the dimension of the portion of the bulb near the magnets in any direction not parallel to that of the magnetic field and the dimension of at least one portion of the bulb except the portion of the bulb near the magnets.

According to another feature of the present invention, there is provided a lamp in which the direction of the electric field between the cathode and the anode is parallel to that of the magnetic field of the magnet.

Other objects, features and advantages of the present invention will be apparent when the following description in the specification is read in conjunction with the attached drawings.

DESCRIPTION OF THE PREFERRED EMBODIMENT

Figure 1:
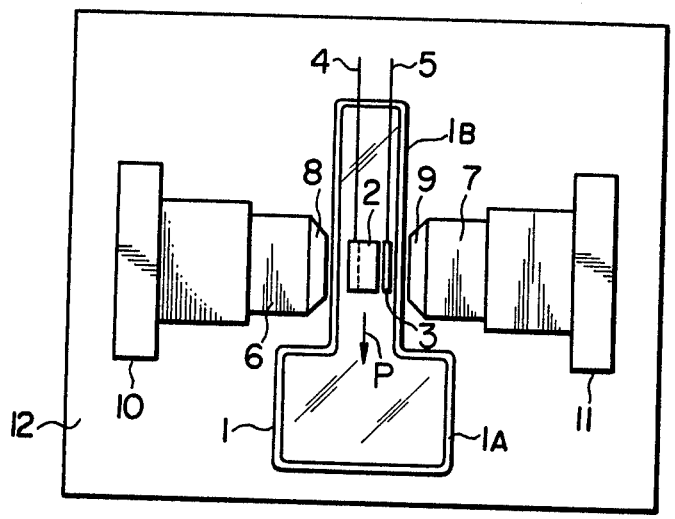
FIG. 1 is a plan view of a lamp as one embodiment of the present invention.
Figure 2:
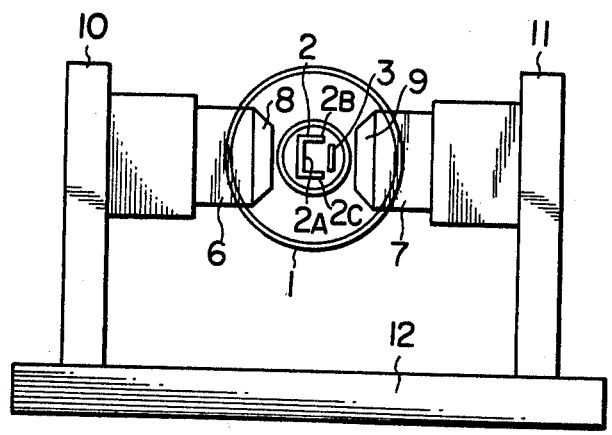
FIG. 2 is a bottom view of the lamp shown in FIG. 1.

In reference to FIGS. 1 and 2, a bulb 1 is made of transparent glass and filled with inert gas, e.g. argon, at about several Torr. One portion 1A and another portion 1B of the bulb 1 have both circular cross sections and the diameter of the portion 1A is larger than that of the portion 1B. A cathode 2 and an anode 3 in the form of a flat plate are disposed opposite to each other within the portion 1B. The cathode 2 and the anode 3 are supported respectively by lead wires 4 and 5 hermetically piercing the end wall of the portion 1B. The cathode 2 is formed of the same material as that which is desired to be analyzed and the cathode 2 consists of a part 2A having a substantially square shape and parts 2B and 2C extending from the ends of the part 2A toward the anode 3, parallel to each other and perpendicular to the part 2A. Permanent magnets 6 and 7 have pole pieces 8 and 9 at their respective ends and are fixed to a base plate 12 respectively via supporting plates 10 and 11. One of the free ends of the permanent magnets 6 and 7 is the N pole and the other is the S pole and the supporting plates 10 and 11 and the base plate 12 constitute a magnetic path. The part of the portion 1B of the bulb 1 around the cathode 2 and the anode 3 is interposed between the magnets 6 and 7 in such a manner that the direction of the magnetic field induced by the magnets 6 and 7 is parallel to that of the electric field established between the cathode 2 and the anode 3. The bulb 1 is supported by an appropriate member fixed to the base plate 12 but for simplicity the supporting structure is not shown in the figure.

Figure 3:
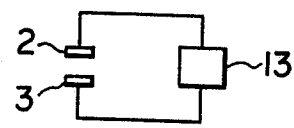
FIG. 3 is a circuit of a power source used with the lamp shown in FIGS. 1 and 2.

In reference to FIG. 3, reference numerals 2 and 3 respectively designate the cathode and the anode shown in FIGS. 1 and 2, and the cathode 2 and the anode 3 are connected with the ends of a constant-current source 13.

If a constant current of about 3 to 20 mA from the source 13 flows across the cathode 2 and the anode 3 (in this case the voltage between the electrodes is about 130 – 300 V), electric discharge takes place between the electrodes. Accordingly, the inner surface of the cathode 2 defining a hollow is sputtered by the positive ions produced as a result of the ionization of the inert gas due to the discharge, so that particles of the material forming the cathode 2 are produced in the hollow of the cathode 2. Moreover, the collision of the positive ions against the cathode 2 liberates secondary electrons from the cathode 2 and the secondary electrons are accelerated toward the anode 3. The electrons produced due to the ionization of the discharging gas are also accelerated toward the anode 3. When the cathode particles are struck by the electrons and the positive ions, the particles are excited to emit light proper to the material of the cathode 2. The light travels in the direction indicated by an arrow P and then leaves the bulb 1. The cathode 2 does not form a complete hollow but a semihollow so that the lamp shown in FIG. 1 and 2 has the hollow effect. In this sense, the cathode 2 may be called a hollow cathode. In the light emission domain, i.e. space between the cathode 2 and the anode 3, is established a magnetic field of about 20 Kgauss due to the permanent magnets 6 and 7, and the direction of the magnetic field is parallel to that of the electric field between the cathode 2 and the anode 3. Accordingly, a single spectral line of light emitted from the cathode particles in the absence of the magnetic field is split into plural components. In this case, the direction of the light being observed is perpendicular to the magnetic field so that the obtained spectral lines are the $\pi$-component having a plane of oscillation parallel to the magnetic field, the $\sigma\pm$ and $\sigma^-$-components having a plane of oscillation perpendicular to the magnetic field.

In practice, it is possible to reduce the diameter of the portion 1B from about 16 mm (this dimension is usual with a conventional lamp) to about 4 mm - 5 mm, i.e. by a factor of $\frac{1}{3} - \frac{1}{4}$, and therefore to obtain a magnetic field three to four times as intense as the conventional one since the intensity of magnetic field is inversely proportional to the gap length between the magnetic poles. In other words, the volume and therefore weight of a magnet is inversely proportional to the square of the gap length. Consequently, in order to induce magnetic field having a certain intensity, the volume and therefore weight of a magnet used in the present invention can be reduced by a factor of about 1/10 - 1/15, as compared with those of the conventional magnet.

If the diameter of the portion 1A is reduced along with the diameter of the portion 1B, the internal volume of the bulb 1 and therefore the amount of gas contained in the bulb 1 is decreased so that the life of the lamp is shortened. In the lamp shown in FIGS. 1 and 2, the portion 1A has a larger diameter than the portion 1B. If the diameter of the portion 1A is increased enough to compensate the decrease in the diameter of the portion 1B, the same life time as obtained with a conventional lamp which uses a tubular bulb having a uniform diameter, can be attained. Thus, according to the embodiment shown in FIGS. 1 and 2, magnetic field having a magnetic intensity of about 20 K gauss can be induced by the use of a very small and light magnet, and that without decreasing the life time.

In the above embodiment, the cross section of the portion 1B is circular but the portion 1B may be so formed as to have a rectangular cross section, though it may need higher techniques in fabrication, with shorter sides parallel to the direction of the magnetic and the electric fields and longer sides perpendicular to the direction of these fields. Further, the cross section of the portion 1A is by no means limited to circle and the cross sectional area of a part of the portion 1B except that part which surrounds the cathode and the anode may be larger than that of the part surrounding the electrodes.

If such a small and light permanent magnet as used in the embodiment shown in FIGS. 1 and 2 is used with a conventional bulb having a diameter of about 16 mm, magnetic field having an intensity of at most about 4 - 5 K gauss can only be obtained. Accordingly, in such a case, Zeeman effect is so small that only the $\sigma^-$- and $\sigma^+$-components can be used as sample and reference lights, respectively. On the other hand, according to the embodiment shown in FIGS. 1 and 2, the small and light permanent magnet can develop magnetic field having an intensity of about 20 K gauss so that the $\pi$-component and the $\sigma^-$- and $\sigma^+$-components can be obtained, the wavelengths of these components being different from one another to such an extent that they can be used as sample and reference lights, respectively. In case where the $\sigma^-$- and $\sigma^+$-components are used respectively as sample and reference lights, as in the prior art, there are raised problems: a phase plate to convert circularly polarized light into linearly polarized one is needed and a light conducting duct must be cut through the magnet in the direction of the magnetic field since in this case the light should be observed in the direction of the field. On the other hand, according to the present invention, the $\pi$-component is used as sample light while the $\sigma^-$- and $\sigma^+$-components are used as reference light, so that such problems can be eliminated.

According to the principle of designing the lamp, the magnets may be placed in the bulb but that structure will be accompanied by a difficulty in fabrication. The embodiment shown in FIGS. 1 and 2 has a structure in which the magnets are disposed outside the bulb and the fabrication is much facilitated.

As described above, in case where the magnetic field is not parallel to the electric field, the electrons are affected mainly by Lorentz force so that the discharge becomes unstable and in a limiting case does not take place. According to the embodiment shown in FIGS. 1 and 2, the cathode 2 and the anode 3 are interposed between the magnets 6 and 7 and in alignment with the magnets 6 and 7 so that the directions of the magnetic and electric fields are parallel to each other with no Lorentz force existing. Lorentz force F is defined by the vactor product of H and I such that $\vec{F} = \vec{H} \times \vec{I} = \vec{n}HIsin\theta$, where H is the intensity of magnetic force, I is the current flowing in the direction of the electric field, $\theta$ is the angle between the vectors $\vec{H}$ and $\vec{I}$, and $\vec{n}$ is the unit vector in the direction of the vector $\vec{F}$. In the embodiment shown in FIGS. 1 and 2, $\theta$ is 0° or 180° and therefore $\vec{F} = 0$. Accordingly, the discharge condition as in the absence of the magnetic field can be attained so that the problem, which is caused in case where the directions of the magnetic and the electric fields are not coincident with each other, that the light intensity is unstable or the light emission does not take place for magnetic field of high intensity, is eliminated.

Figure 4:
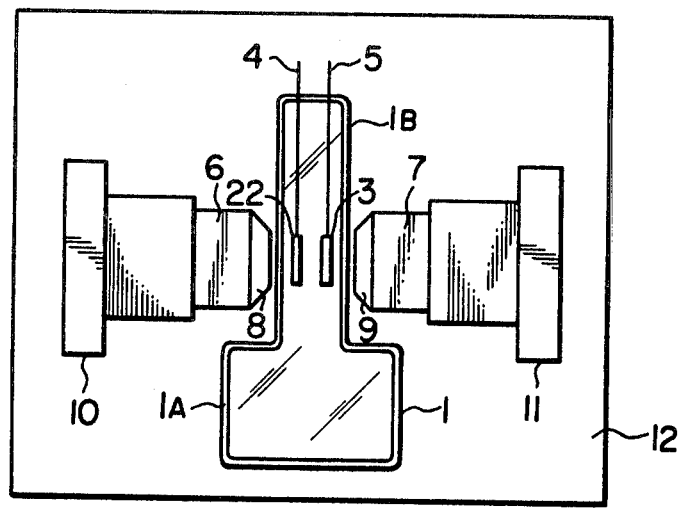
FIG. 4 is a plan view of a lamp as another embodiment of the present invention.
Figure 5:
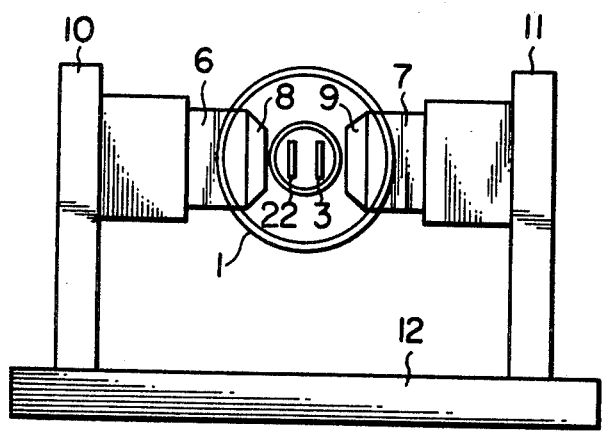
FIG. 5 is a bottom view of the lamp shown in FIG. 4.

FIGS. 4 and 5 show in plan and bottom views another embodiment of the present invention. The difference of this embodiment from that shown in FIGS. 1 and 2 is that the cathode 22 in this embodiment is in the shape of flat plate and disposed parallel to the anode 3. The process of light emission is the same in both the embodiments but the embodiment in FIGS. 4 and 5 has not hollow effect since the cathode 22 is flat and parallel to the anode 3. Namely, the discharge maintaining voltage is higher in the embodiment in FIGS. 4 and 5 than in the embodiment in FIGS. 1 and 2. It is clear, however, that the embodiment in FIGS. 4 and 5 can enjoy the same effect as obtained by the embodiment in FIGS. 1 and 2. In FIGS. 4 and 5, the same reference numerals and characters are applied to like parts and members as in FIGS. 1 and 2. The embodiment in FIGS. 4 and 5 can be used with the power source circuit shown in FIG. 3, too.

In the above description in the specification, the present invention has been explained by way of embodiments and therefore is by no means limited to those which are described in the specification and shown in the figures. Some variations and modifications will easily occur to the mind skilled in the art and it is intended in the appended claims to cover all those variations and modifications which fall within the spirit and scope of the present invention.

We claim:

1. A lamp comprising a bulb filled with discharging gas, a cathode and an anode disposed in said bulb opposite to each other, an electric power source to cause electric discharge between said cathode and anode so as to produce spectrum of light, and magnets to induce magnetic field to split the spectrum of light, wherein said bulb has at least one transparent portion through which the spectrum of light is taken out, said magnets are disposed outside said bulb and near that portion of said bulb which surrounds said cathode and anode, and the dimension of said portion of said bulb near said magnets in the direction of said magnetic field of said magnets is smaller than at least one of both the dimension of said portion of said bulb near said magnets in any direction not parallel to that of said magnetic field and the dimension of at least one portion of said bulb except said portion of said bulb near said magnets, said cathode being a hollow cathode.

2. A lamp as claimed in claim 1, wherein said magnets are permanent magnets.

3. A lamp as claimed in claim 1, wherein the direction of said magnetic field is parallel to that of the electric field between said cathode and anode.

4. A lamp as claimed in claim 1, wherein said magnets are so disposed with said cathode and anode interposed therebetween that the direction of said magnetic field is parallel to that of the electric field between said cathode and anode.

5. A lamp as claimed in claim 1, wherein said spectrum of light is taken out in the direction perpendicular to that of said magnetic field.

6. A lamp as claimed in claim 4, wherein said spectrum of light is taken out in the direction perpendicular to that of said magnetic field.

7. A lamp comprising a bulb filled with discharging gas, a cathode and an anode disposed in said bulb opposite to each other, an electric power source to cause electric discharge between said cathode and anode so as to produce spectrum of light, and magnets to induce magnetic field to split the spectrum of light, wherein said bulb has at least one transparent portion through which the spectrum of light is taken out, said magnets are disposed outside said bulb and near that portion of said bulb which surrounds said cathode and anode, and the dimension of said portion of said bulb near said magnets in the direction of said magnetic field of said magnets is smaller than at least one of both the dimension of said portion of said bulb near said magnets in any direction not parallel to that of said magnetic field and the dimension of at least one portion of said bulb except said portion of said bulb near said magnets, said cathode and said anode being flat plates disposed parallel to each other.

8. A lamp comprising a bulb filled with discharging gas, a cathode and an anode disposed in said bulb opposite to each other, an electric power source to cause electric discharge between said cathode and anode so as to produce spectrum of light, and magnets to induce magnetic field to split the spectrum of light, wherein said bulb has at least one transparent portion through which the spectrum of light is taken out, said magnets are disposed outside said bulb and near that portion of said bulb which surrounds said cathode and anode, and the dimension of said portion of said bulb near said magnets in the direction of said magnetic field of said magnets is smaller than at least one of both the dimension of said portion of said bulb near said magnets in any direction not parallel to that of said magnetic field and the dimension of at least one portion of said bulb except said portion of said bulb near said magnets, the cross section of said portion of said bulb near said magnets is circular and at least one of the other portions of said bulb has a circular cross section with a diameter larger than that of said cross section of said portion of said bulb near said magnets.

9. A lamp comprising a bulb filled with discharging gas, a cathode and an anode disposed in said bulb opposite to each other, an electric power source to cause electric discharge between said cathode and anode so as to produce spectrum of light, and magnets to induce magnetic field to split the spectrum of light, wherein said bulb has at least one transparent portion through which the spectrum of light is taken out, said magnets are disposed outside said bulb and near that portion of said bulb which surrounds said cathode and anode, and the dimension of said portion of said bulb near said magnets in the direction of said magnetic field of said magnets is smaller than at least one of both the dimension of said portion of said bulb near said magnets in any direction not parallel to that of said magnetic field and the dimension of at least one portion of said bulb except said portion of said bulb near said magnets, said cathode is a hollow cathode and wherein the cross section of said portion of said bulb near said magnets is circular and at least one of the other portions of said bulb has a circular cross section with a diameter larger than that of said cross section of said portion of said bulb near said magnets.

10. A lamp as claimed in claim 9, wherein said magnets are permanent magnets.

11. A lamp as claimed in claim 10, wherein the direction of said magnetic field is parallel to that of the electric field between said cathode and anode and wherein said spectrum of light is taken out in the direction perpendicular to that of said magnetic field.

12. A lamp comprising a bulb filled with discharging gas, a cathode and an anode disposed in said bulb opposite to each other, an electric power source to cause electric discharge between said cathode and anode so as to produce spectrum of light, and magnets to induce magnetic field to split the spectrum of light, wherein said bulb has at least one transparent portion through which the spectrum of light is taken out, said magnets are disposed outside said bulb and near that portion of said bulb which surrounds said cathode and anode, and the dimension of said portion of said bulb near said magnets in the direction of said magnetic field of said magnets is smaller than at least one of both the dimension of said portion of said bulb near said magnets in any direction not parallel to that of said magnetic field and the dimension of at least one portion of said bulb except said portion of said bulb near said magnets, said cathode and said anode are flat plates disposed parallel to each other and wherein the cross section of said portion of said bulb near said magnets is circular and at least one of the other portions of said bulb has a circular cross section with a diameter larger than that of said cross section of said portion of said bulb near said magnets.

13. A lamp as claimed in claim 12, wherein said magnets are permanent magnets.

14. A lamp as claimed in claim 13, wherein the direction of said magnetic field is parallel to that of the electric field between said cathode and anode and wherein said spectrum of light is taken out in the direction perpendicular to that of said magnetic field.

* * * * *